(12) United States Patent
Kesner et al.

(10) Patent No.: US 8,047,226 B2
(45) Date of Patent: Nov. 1, 2011

(54) PRESSURE RELIEF VALVES AND PNEUMATIC CONTROL SYSTEMS

(75) Inventors: Ed Kesner, Mesa, AZ (US); Larry Robert Casillas, Phoenix, AZ (US); Javier Gutierrez, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 805 days.

(21) Appl. No.: 12/141,532

(22) Filed: Jun. 18, 2008

(65) Prior Publication Data
US 2009/0314364 A1 Dec. 24, 2009

(51) Int. Cl.
F16K 31/38 (2006.01)
(52) U.S. Cl. ............... 137/489; 137/492.5; 137/494; 251/58; 251/242; 251/282; 251/368
(58) Field of Classification Search .......... 137/49, 137/58, 82, 488–492, 492.5, 494, 499, 629; 251/58, 86, 237, 242, 243, 244, 282, 368; 60/785
See application file for complete search history.

(56) References Cited

U.S. PATENT DOCUMENTS

| 660,359 | A | * | 10/1900 | Bullard | 137/492.5 |
| 2,635,392 | A | * | 4/1953 | Gratzmuller | 137/505.47 |
| 2,794,600 | A | | 6/1957 | Ehlke | |
| 3,121,373 | A | * | 2/1964 | Murphy et al. | |
| 3,769,998 | A | * | 11/1973 | Avant | 137/116.5 |
| 4,617,958 | A | * | 10/1986 | Seidel et al. | 137/492.5 |
| 6,684,898 | B2 | * | 2/2004 | Wiggins et al. | 137/15.25 |
| 6,694,746 | B2 | * | 2/2004 | Reed et al. | 60/787 |
| 7,147,430 | B2 | * | 12/2006 | Wiggins et al. | 415/19 |

FOREIGN PATENT DOCUMENTS
GB 1557051 A 12/1979
* cited by examiner

Primary Examiner — Stephen M Hepperle
Assistant Examiner — Matthew W Jellett
(74) Attorney, Agent, or Firm — Ingrassia Fisher & Lorenz, P.C.

(57) ABSTRACT

A pressure relief valve includes a lever plate, a first spring, a fitting, and a guide assembly. The fitting has a first side, a second side, and a flange having a rounded end and includes a surface with which a first end of the first spring contacts. The guide assembly has two sides, two concavities, and at least a portion of the guide assembly extends through the opening of the lever plate, the first concavity is formed on the first side of the guide assembly and contacts the fitting flange rounded end, and the second concavity is aligned coaxially with the first concavity. A rounded end of a rod of the diaphragm assembly contacts the second concavity. The second spring is adapted to supply a second force against the diaphragm assembly to move the lever plate in a second direction that is substantially opposite the first direction.

20 Claims, 3 Drawing Sheets

PRESSURE RELIEF VALVES AND PNEUMATIC CONTROL SYSTEMS

TECHNICAL FIELD

The inventive subject matter generally relates valves and more particularly relates to pressure relief valves and pneumatic control systems that may include the valves.

BACKGROUND

Gas turbine engines may be used to power aircraft and may include a fan section, a compressor section, a combustor section, a turbine section, and an exhaust section. The fan section is positioned at the front, or "inlet" section of the engine, and includes a fan that induces air from the surrounding environment into the engine. The fan section accelerates a fraction of the air toward the compressor section. The remaining fraction of air is accelerated into and through a bypass plenum, and out the exhaust section. The compressor section raises the pressure of the air it receives from the fan section to a relatively high level. The compressed air then enters the combustor section, where a ring of fuel nozzles injects a steady stream of fuel into the air. The injected fuel is ignited by a burner, which significantly increases the energy of the compressed air. The high-energy compressed air then flows into and through the turbine section, causing rotationally mounted turbine blades to rotate and generate energy. The air exiting the turbine section is exhausted from the engine via the exhaust section, and the energy remaining in this exhaust air aids the thrust generated by the air flowing through the bypass plenum.

Many gas turbine engines, such as the above-described turbofan gas turbine engine, selectively bleed air from the compressor section for the operation of aircraft systems that may be at least partially pneumatically operated. The bleed air may be diverted to a starter control system that may include pneumatically-operated components, such as a pressure relief valve. The pressure relief valve may be used to control an amount of air that is present within the starter control system.

Although the pressure relief valve used in the system is generally well-designed, it may be improved. In particular, in some configurations, the pressure relief valve may include two opposing pre-loaded springs disposed on either side of a spring plate along a single axis. At least one of the springs may be in direct contact with the spring plate. During operation, if a first spring exerts a force against a first side of the spring plate that exceeds a second force exerted by a second spring against a second, opposite side of the spring plate, the spring plate will move toward the second spring. However, because the two springs may move in different directions along a surface of the spring plate, each may deviate from an original position relative to the axis and may exert pressure at different locations on the spring plate. As a result, the pressure relief valve may experience hysteresis, which may decrease a useful life of the components of the valve.

Accordingly, it is desirable to have an improved pressure relief valve that minimizes hysteresis. In addition, it is desirable for the pressure relief valve to be capable of being retrofitted into currently existing engines or aircraft and that may be relatively inexpensive to implement. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Pressure relief valves and pneumatic control valve systems are provided.

In an embodiment, by way of example only, a pressure relief valve includes a lever plate, a first spring, a fitting, a guide assembly, a first air supply passage, and a second air supply passage. The lever plate has a first side, a second side, and an opening extending therebetween. The first spring is positioned on the first side of the lever plate and has a first end. The first spring is also adapted to supply a first force against the lever plate in a first direction. The fitting has a first side, a second side, and a flange extending from the second side of the fitting. The fitting includes a surface with which the first end of the first spring contacts, and the flange includes a rounded end. The guide assembly has a first side, a second side, a first concavity, and a second concavity, and at least a portion of the guide assembly extends through the opening of the lever plate, the first concavity is formed on the first side of the guide assembly and contacts the rounded end of the flange of the fitting, and the second concavity is aligned coaxially with the first concavity. The diaphragm assembly includes a rod having a rounded end, and the rounded end of the rod is disposed in contact with the second concavity of the guide assembly. The second spring is adapted to supply a second force against the diaphragm assembly to move the lever plate in a second direction that is substantially opposite the first direction.

In another embodiment, by way of example only, a pneumatic control valve system includes a main duct, a torque motor in flow communication with the main duct, a pressure relief valve in flow communication with and disposed between the torque motor and the main duct, a first air supply passage, and a second air supply passage. The pressure relief valve includes a lever plate, a first spring, a fitting, a guide assembly, a diaphragm assembly, and a second spring. The lever plate has a first side, a second side, and an opening extending therebetween. The first spring is positioned on the first side of the lever plate and has a first end, and the first spring is adapted to supply a first force against the lever plate in a first direction. The fitting has a first side, a second side, and a flange extending from the second side of the fitting, ad the fitting includes a surface with which the first end of the first spring contacts. The flange includes a rounded end. The guide assembly has a first side, a second side, a first concavity, and a second concavity, and at least a portion of the guide assembly extends through the opening of the lever plate, the first concavity is formed on the first side of the guide assembly and contacting the rounded end of the fitting flange, and the second concavity is aligned coaxially with the first concavity. The diaphragm assembly includes a first flexible diaphragm, a second flexible diaphragm, and a rod extending therebetween, and the rod has a rounded end disposed in contact with the second concavity of the guide assembly. The second spring is adapted to supply a second force against the diaphragm assembly to move the lever plate in a second direction that is substantially opposite the first direction. The first air supply passage is adapted to supply air at a first pressure to a space between the first flexible diaphragm and the second flexible diaphragm. The second air supply passage is adapted to supply air at a second pressure to the second flexible diaphragm.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
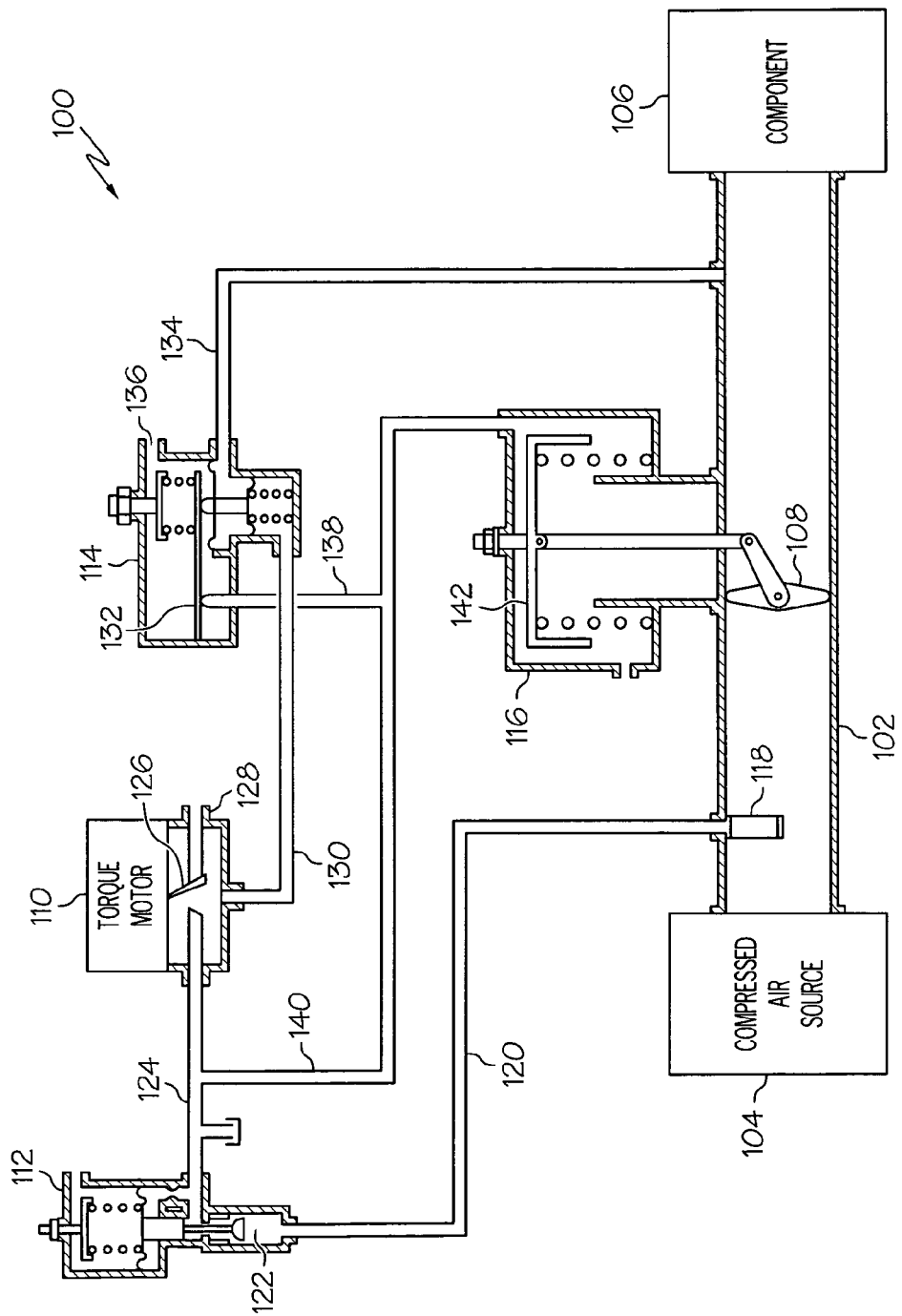
FIG. 1 is a simplified schematic of a pneumatic control valve system, according to an embodiment.

FIG. 1 is a simplified schematic of a pneumatic control valve system 100, according to an embodiment. The system 100 is configured to control airflow through a main duct 102 that connects a compressed air source 104 and a component 106 and may more accurately control the rate of airflow through the system 100, and ultimately, through the main duct 102, as compared to conventional pneumatic control systems. In an embodiment, the compressed air source may be an auxiliary power unit, a compressor stage of a gas turbine engine, or a gas turbine ground power cart. The component 106 may be an air turbine starter, an environment control system, or any other pneumatically-operated engine component of an aircraft system.

Airflow is controlled through the main duct 102 via a valve 108. The valve 108 may be a butterfly valve, as shown in FIG. 1, or a poppet valve or any other valve capable of regulating the airflow through the main duct 102 by opening and closing in response to commands from one or more control components. In an embodiment, the valve 108 may be controlled by a torque motor 110 and by pneumatically-controlled components, such as a reference pressure regulator 112, a pressure relief valve 114 and/or an actuator 116. In other embodiments, the valve 108 may be controlled by additional components.

During operation of the system 100, a portion of the airflow from the main duct 102 may be diverted through a filter 118 into the reference pressure regulator 112 by a reference pressure line 120. The reference pressure line 120 may be a duct, pipe, or other component that extends from the main duct 102 and that is adapted to direct an airflow to the reference pressure regulator 112. In an embodiment, the reference pressure line 120 may receive air downstream from the compressed air source 104. The reference pressure regulator 112 may be configured to respond to air pressure from the airflow so that if the air pressure is above a threshold value, a valve 122 closes to prevent air from flowing past the valve 122. In an embodiment, the threshold value may be between about 10 psi and about 400 psi. The valve 122 may be any type of valve capable of controlling air flow. If the air pressure is below the threshold valve, the airflow may then flow to a first line 124. In other embodiments, the system 100 may not include the reference pressure regulator 112 and may alternatively flow air directly to the first line 124.

In an embodiment, the first line 124 may be in flow communication with the torque motor 110. The first line 124 may be a duct, a pipe, or other component capable of directing airflow. The torque motor 110 is configured to move a valve element 126 between an open and a closed position in response to an electrical current provided by a controller (not shown). As used herein, an "open position" may be defined as a valve position allowing flow through of at least 5% of a flow area. A "closed position" may be defined as a valve position blocking substantially all (e.g., more than 99%) flow across a flow area. The valve element 126 may be a flapper, as shown in FIG. 1, or a ball or any other type of valve element. When the valve element 126 is in the open position, at least a portion of air flowing through the system 100 flows through the torque motor 110 and out a vent nozzle 128. The vent nozzle 128 may bleed the air through a fixed orifice having a flow area within a range of between 0.109 cm to 0.114 cm, in an embodiment. In other embodiments, the vent nozzle 128 may include a variable diameter orifice having a flow area within the aforementioned range. When the valve element 126 is in the closed position, substantially all (e.g., greater than 99%) of the air is blocked from flowing out of the vent nozzle 128 and is directed to a second line 130. The second line 130 may be a duct, a pipe, or other component capable of directing airflow and may allow the air to flow toward the pressure relief valve 114.

The pressure relief valve 114 is adapted to relieve pressure that may build up as the air flows through the system 100 and may be a pneumatically-operated component, in an embodiment. For example, in an embodiment, the pressure relief valve 114 may include a valve element 132, which may be a lever plate (as shown in FIG. 1) or another suitable type of valve component that moves in response to air pressure from the airflow. According to an embodiment, the valve element 132 is configured to transition between a closed position and an open position, based on whether the air pressure of the airflow is below a first threshold value or above a second threshold value. In an example, the air pressure may be a combination of air pressure of airflow from the second line 130 and airflow from a third line 134, where the third line 134 communicates with the main duct 102. The third line 134 may be a duct, a pipe, or other component capable of directing airflow. When the air pressure is below the first threshold value, the valve element 132 remains in the closed position. In an embodiment, the first threshold value may be between about 10 psi and about 50 psi. If the air pressure is above the second threshold value, the valve element 132 may transition to the open position. In such case, the air may flow to a fourth line 138 toward the actuator 116. In an embodiment, the second threshold value may be between about 10 psi and about 30 psi and may or may not be equal to the first threshold value. The fourth line 138 may be a duct, a pipe, or other component capable of directing airflow. Excess air that may be trapped within the pressure relief valve 114 may vent through a vent orifice 136, in an embodiment. The vent orifice 136 may be a fixed orifice having a flow area within a range of between 0.127 cm to 0.762 cm, in an embodiment. In other embodiments, the vent orifice 136 may include a variable diameter orifice having a flow area within the aforementioned flow area range.

In accordance with another embodiment, the first line 124 may also be in flow communication with a fifth line 140. The fifth line 140 may be a duct, a pipe, or other component capable of diverting a portion of airflow from the first line 124 and may be adapted to receive air from the pressure relief valve 114 via the fourth line 138, while the valve element 132 is in the closed position and, as alluded to above, delivers the air to the actuator 116, in an embodiment. In another embodiment, the fifth line 140 may also be adapted to direct air from the reference pressure regulator 112 to the actuator 116. The actuator 116 may include a piston 142 that responds to air pressure from the air received from the fifth line 140 to move and to thereby supply torque to the valve 108 in a desired direction and at a desired rate.

Figure 2:
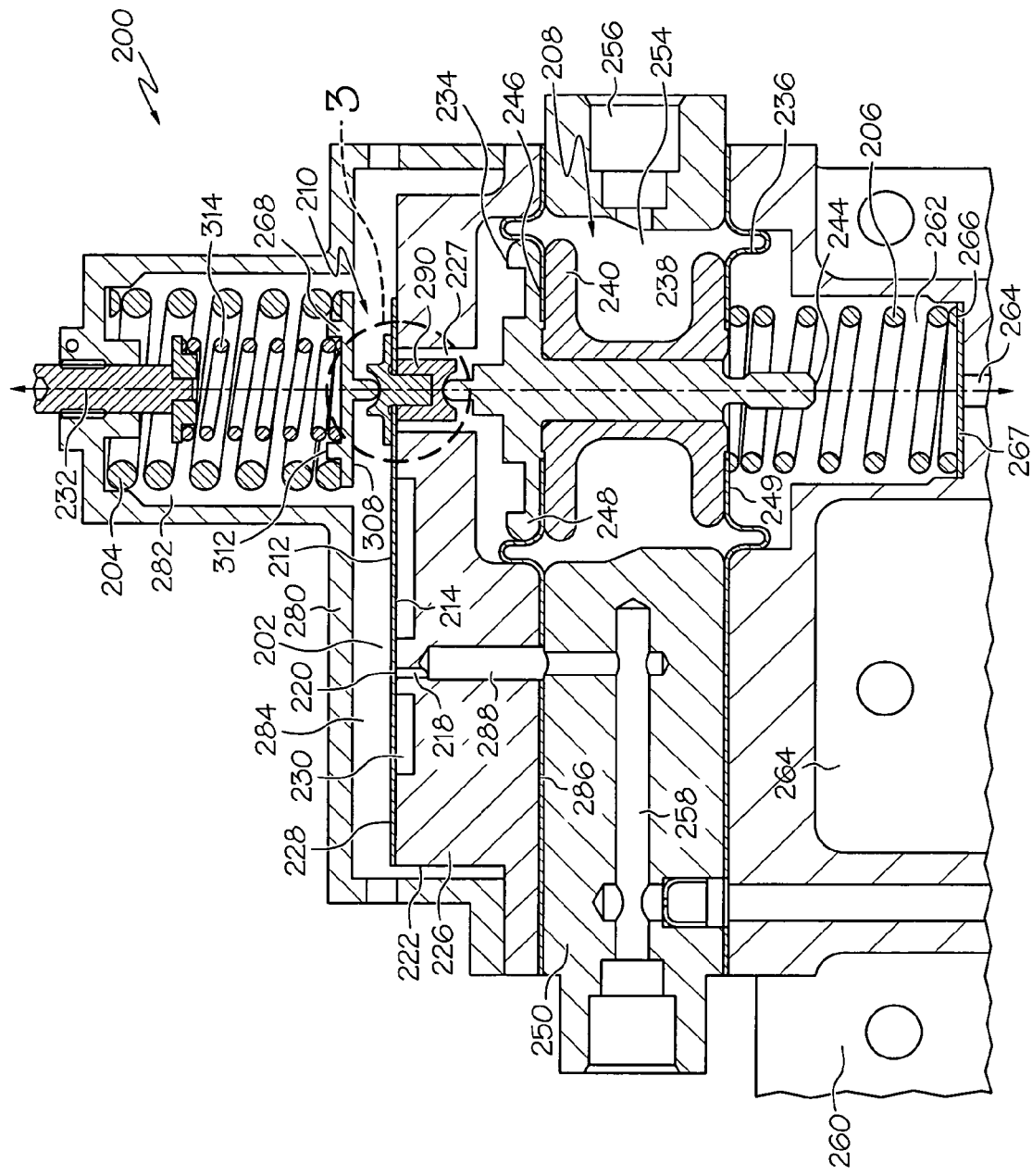
FIG. 2 is a cross-sectional view of a pneumatic control valve system, according to an embodiment.

As mentioned above, the pneumatic control system 100 may more accurately control the air flowing therethrough than other conventional systems. To do so, the pressure relief valve 114 of the system 100 may include components that are configured to minimize hysteresis. Turning now to FIG. 2, a cross-sectional view is provided of a pressure relief valve 200 that may be implemented into the pneumatic control system 100 of FIG. 1, according to an embodiment. The pressure relief valve 200 includes a lever plate 202, a first spring 204, a second spring 206, a diaphragm assembly 208, and a guide assembly 210, in an embodiment.

Generally, the first spring 204 and the second spring 206 are disposed on either side of the lever plate 202 and include the diaphragm assembly 208 and the guide assembly 210 interposed therebetween. All of the aforementioned valve components are disposed within an outer housing 280 that is spaced apart from a mount plate 226, which is coupled to two gas connection plates 250, 260, in an embodiment. In accordance with another embodiment, the outer housing 280 is adapted to include a cavity 282 within which the first spring 204 is positioned. In this regard, the cavity 282 may have dimensions that correspond with the dimensions of the first spring 204. For example, the cavity 282 may be cylindrically-shaped and may have a diameter that is slightly larger than that of the first spring 204 and an axial length that is substantially equal to or less than the axial length of the first spring 204. Thus, in an embodiment, if the first spring 204 has a diameter in a range of between about 2.05 cm and about 2.10 cm and an axial length of between about 2.41 cm and about 2.67 cm, the cavity 282 may have a diameter in a range of between about 2.38 cm to about 2.44 cm and an axial length may be in a range of between about 4.34 cm to about 4.45 cm. In other embodiments, the dimensions may be larger or smaller.

A portion of the outer housing 280 may be spaced apart from and coupled to a first side 228 of the mount plate 226 to form a chamber 284 within which the lever plate 202 is disposed. Accordingly, the chamber 284 may be dimensioned to provide sufficient space for the lever plate 202 to transition between an open and a closed position and thus, may have a length and a width that accommodates the length and width of the lever plate 202. Additionally, the mount plate 226 may include an opening 227 that extends between the first and second sides 228, 286 within which the guide assembly 210 may disposed. In another embodiment, the mount plate 226 may further include a flow passage 288 including a relief outlet 220 that fluidly communicates with the fourth line 138 of FIG. 1. To ensure that the air flows through the fourth line 138 at a desired rate and pressure, the relief outlet 220 may be a fixed diameter orifice having a diameter in a range of between about 10 mm to about 12 mm, in an embodiment. In other embodiments, the diameter of the relief outlet 220 may be larger or smaller. In yet other embodiments, the relief outlet 220 may have a variable diameter orifice.

As mentioned above, the mount plate 226 may be coupled to the first gas connection plate 250. In an embodiment, the first gas connection plate 250 includes a diaphragm assembly chamber 254 within which the diaphragm assembly 208 is disposed. The diaphragm assembly chamber 254 communicates with a spring chamber 262 that is configured to housing the second spring 206. In this regard, the spring chamber 262 may be generally cylindrically-shaped and may include a bottom surface 266 over which the second spring 206 may be positioned. According to an embodiment, a washer 267 may be disposed between the second sprint 206 and the bottom surface 267 In an embodiment, the spring chamber 262 may have a diameter that is slightly larger than the second spring 206, but may have a length that is substantially equal to or smaller than that of the second spring 206. Thus, in an embodiment, if the second spring 206 has a diameter in a range of between about 1.70 cm and about 1.75 cm and an axial length of between about 2.18 cm and about 2.26 cm, the spring chamber 262 diameter may be in a range of between about 1.92 cm to about 1.94 cm and the axial length may be in a range of between about 2.08 cm to about 2.11 cm.

Generally, according to an embodiment, the lever plate 202 is adapted to flex in response to a pressure build up within the pressure relief valve 200. According to an embodiment, the pressure build up may cause the diaphragm assembly 208 to exert a force at a first location on one side 214 of the lever plate 202 that exceeds a force exerted by the first spring 204 at a second location that is on an opposite side 212 of the lever plate 202. In this regard, the first spring 204 exerts a first force on the first side 212, and the second spring 206 and the diaphragm assembly 208 exert a second force on the second side 214. Additionally, in an embodiment, the lever plate 202 may include an opening 216 that extends between the sides 212, 214 of the lever plate 202 and is configured for mounting the guide assembly 210 between the diaphragm assembly 208 and the first spring 204. According to another embodiment, the lever plate 202 may also include a valve seat location 218 for providing a surface against which the relief outlet 220 in the pressure relief valve 200 may seat, in another embodiment. Thus, when the lever plate 202 flexes, air flowing through the valve 200 may exit via the relief outlet 220.

The lever plate 202 is adapted to flex in response to relatively small differentials (e.g., less than about 0.50 cm) between the first and the second forces. Accordingly, the lever plate 202 may comprise materials selected for having a desired spring property and may include a configuration that enhances the spring properties of the selected material. For example, the lever plate 202 may have a spring constant in a range of between about 2 psi to about 5 psi and thus, may be made of suitable materials, such as 17-7 precision hardened stainless steel or a nickel-based superalloy, such as, Inconel 718, and the like. The lever plate 202 may include one or more of the aforementioned materials, or may include other materials along with the aforementioned materials. In other examples, other materials having spring-like properties may alternatively be employed.

To enhance the spring properties of the lever plate 202, in an embodiment, the lever plate 202 may have a thickness in a range of between about 0.40 mm to about 0.50 mm, in an embodiment. In other embodiments, the thickness may be smaller or larger than the aforementioned range. According to another embodiment, the lever plate 202 may have a shape that enhances its spring properties, and may be a strip, beam, or may have any other shape that is thin and long relative to its width. In an embodiment, the lever plate 202 may have a length that is in a range of between about 5.79 cm to about 5.90 cm, and a width in a range of between about 1.51 cm to about 1.54 cm.

In another embodiment, the lever plate 202 may have a first length measured from its first end 222 to the valve seat location 218 and a second length from the first end 222 to the lever plate opening 216, and the lengths may be related to each other by a particular ratio. The ratio may be selected based on a desired spring preload or flow rate. In one example embodiment, the first length may be in a range of between about 3.65 cm to about 3.71 cm, or in another example embodiment, the first length may be about 3.68 cm. The second length may be in a range of between about 0.71 cm to about 0.76 cm, in an embodiment, or in another embodiment, the second length may be about 0.075 cm. Here, the ratio between the first length and the second length may be about 5.0 cm. In another embodiment, the first and second lengths may be greater or less. For instance, to decrease sensitivity of the lever plate 202, the ratio may be less than 5.0. To increase sensitivity of the lever plate 202, the ratio may be greater than 5.0.

According to another embodiment, the lever plate 202 may be configured to lift away from the relief outlet 220 when flexed. In such case, the lever plate 202 may be disposed over and coupled to the mount plate 226. In an embodiment, the lever plate 202 may be bolted or otherwise fastened to the mount plate 226. In accordance with one embodiment, the lever plate 202 may lie flush against the first side 228 of the mount plate, or alternatively the lever plate 202 may be spaced apart from the first side 228 of the mount plate 226. For example, in accordance with an embodiment, the first side 228 may include several grooves or slots 230 over which the lever plate 202 may be disposed. According to yet another embodiment, the lever plate 202 may extend over the first side 228 at an angle relative thereto.

In an embodiment, the springs 204, 206 are disposed along a single axis 232. The axis 232 extends through the lever plate opening 216 and is substantially perpendicular (e.g., 90°±0.05°) to the lever plate 202, when the lever plate 202 is in the closed position. The springs 204, 206 may be selected such that a differential force exists across the lever plate 202 when the system 100 is not in operation to maintain the lever plate 202 in a closed position, and to allow the lever plate 202 to flex when a force exerted against the lever plate 202 exceeds a threshold force. In this regard, each spring 204, 206 may be selected to have a desired spring constant, preload, and/or stroking rate capacity. For example, the first spring 204 may be a spiral-type spring and may have a spring constant in a range of between about 31.61 kg/cm to about 35.00 kg/cm. In an embodiment, such a spring may be preloaded in a range of between about 4.65 kg to about 5.14 kg. The first spring 204 may then have an axial length of between about 2.41 cm to about 2.67 cm, in an embodiment. The first spring 204 may have dimensions that are larger or smaller than the aforementioned ranges, in other embodiments.

The second spring 206 may have particular dimensions and characteristics that are selected based on the dimensions and characteristics of the first spring 204. For example, the second spring 206 may be a spiral-type spring and may have a spring constant in a range of between about 11.79 kg/cm to about 13.21 kg/cm. In an embodiment, the second spring 206 may be preloaded in a range of between about 2.83 kg to about 8.50 kg. The second spring 206 may then have an axial length of between about 2.18 cm to about 2.26 cm, in an embodiment. The second spring 206 may have dimensions that are larger or smaller than the aforementioned ranges, in other embodiments. According to an embodiment, the second spring 206 may be preloaded to a value that is less than the preload of the first spring 204. For example, the second spring 206 preload may be about 2.2 kg less than the preload of the first spring 204. In this way, the first and second springs 204, 206 may apply a greater from on the lever plate 202, when the pressure relief valve 200 is not in operation or in a steady state to maintain the lever plate 202 in a closed position.

The second spring 206 may exert a force on the lever plate 202 via the diaphragm assembly 208. The diaphragm assembly 208 may include a first flexible diaphragm 234, a second flexible diaphragm 236, a rod 238, and a spacer 240, in an embodiment. In an embodiment, the first and second flexible diaphragms 234, 236 each include portions that extend across the diaphragm assembly chamber 254, and the rod 238 and the spacer 240 disposed in the chamber 254 extend between the diaphragms 234, 236. In particular, in an embodiment, the rod 238 has a rounded first end 242 that extends through an opening in the first flexible diaphragm 234, and a second end 244 that extends through an opening in the second flexible diaphragm 236. The rounded first end 242 may have a spherical shape, in an embodiment. The spacer 240 is disposed concentric to the rod 238 between the two diaphragms 234, 236 to maintain the rod 238 in position within the diaphragm assembly 208. In an embodiment, the spacer 240 has a first end surface 246 that traps the first flexible diaphragm against a radial flange 248 extending outwardly from the rod 238 proximate the first end 242, and a second end surface 249 that traps the second flexible diaphragm 236 against the second spring 206.

To flow air from the system 100 (FIG. 1) to appropriate portions of the valve 200, the diaphragm assembly 208 and springs 204, 206 may communicate with various chambers and flow passages. For example, the diaphragm assembly chamber 254 may communicate with a first flow channel 256 formed in the first gas connection plate 250 that, in turn, communicates with the third line 134 (FIG. 1). Thus, in accordance with an embodiment, air from the first flow channel 256 may be contained within the diaphragm assembly chamber 254 via the first gas connection plate 250. A second flow channel 258, which provides fluid communication between the relief outlet 220 and the fourth line 138 (FIG. 1), may also be formed in the first gas connection plate 250. Accordingly, when pressure from the air within the diaphragm assembly chamber 254 exerts a sufficient force against the first flexible diaphragm 234, the force is transferred to the lever plate 202. If the force exceeds a spring constant of the first spring 204, the lever plate 202 unseats and the air may then flow through the second flow channel 258 to the fourth line 138.

In another embodiment, the second gas connection plate 260 may include a third flow channel 264 that communicates with the spring chamber 262. The third flow channel 264 may provide fluid communication with the second line 130 (FIG. 1) so that when air is received from the second line 130 or the third flow channel 264, the pressure of the air may exert a force against the second flexible diaphragm 236.

Figure 3:
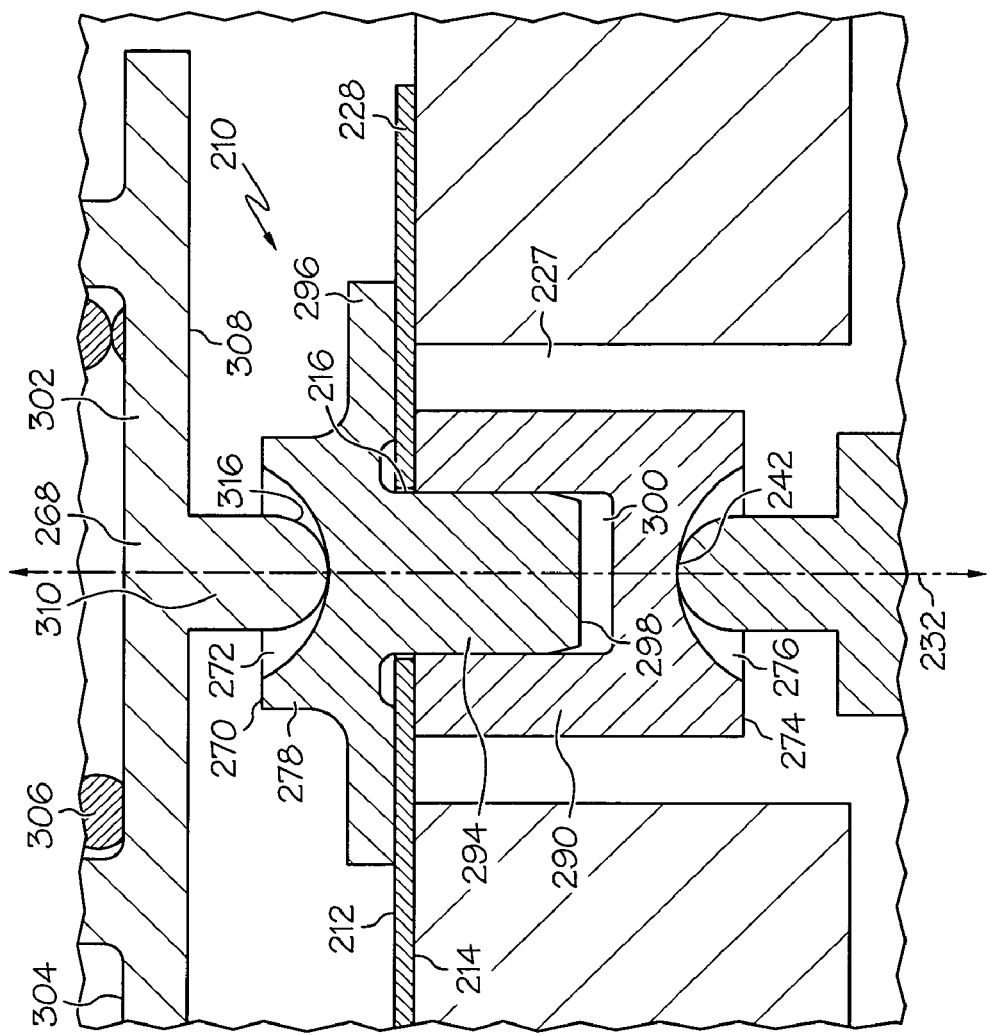
FIG. 3 is a close up view of a portion of the pneumatic control valve system indicated by oval 3-3 in FIG. 2, according to an embodiment.

To ensure that the first spring 204 and the second spring 206 (via the diaphragm assembly 208) each apply forces to substantially the same area on the lever plate 202, the guide assembly 210 and a fitting 268 are disposed therebetween. FIG. 3 is a close up view of a portion of the pressure relief valve 200 indicated by dotted line 3-3 in FIG. 2, according to an embodiment. In an embodiment, the guide assembly 210 is adapted to provide predetermined locations along the axis 232 and through a center of the lever plate opening 216, where the predetermined locations receive opposing forces supplied by the springs 204, 206 and diaphragm assembly 210 (shown in FIG. 2). According to an embodiment, the guide assembly 210 may include a first side 270 that has a first concavity 272, and a second side 274 that has a second concavity 276, and the guide assembly 210 is mounted to the lever plate 202 such that the axis 232 extends through a center of each concavity 272, 276 so that the concavities 272, 276 are coaxially aligned.

The guide assembly 210 may be made up of a single, integrally formed component, or as shown in FIGS. 2 and 3, may include multiple (e.g., two) pieces. For example, the guide assembly 210 may include a button 278 and a sleeve 290. In accordance with an embodiment, the button 278 may include the first side 270 and the first concavity 272 and may further include a stem 294 and a radially-extending flange 296. In an embodiment, the stem 294 extends through the lever plate opening 216 and may be press-fit therein. Thus, for example, the stem 294 may have a diameter that is substantially equal to the diameter of the lever plate opening 216, according to an embodiment. For example, the stem diameter may be about 0.31 cm, while the lever plate opening 216 may be in a range of between about 0.032 cm to about 0.033 cm. In another embodiment, the stem 294 may have a diameter that is slightly larger (e.g., about 0.03 cm) than the lever plate opening 216 to be interference fit therein. In other embodiments, the stem 294 may have a diameter that is smaller than that of the lever plate opening 216. However in such case, an adapter or other additional component may be included to prevent movement of the stem 294 within the opening 216. Another portion of the stem 294, including an end 298 thereof, may be disposed within a well 300 formed in the sleeve 290. In this regard, the well 300 may have a diameter that is substantially equal to the diameter of the stem 294, according to an embodiment. In another embodiment, the well 300 may have a diameter that is slightly smaller (e.g., about 0.03 cm) than the stem 294 for an interference fit therewith. In other embodiments, the well 300 may have a diameter that is larger than that of the stem 294, however in such case, an adapter or other additional component may be included to prevent non-axial movement of the stem 294 within the well 300. The sleeve 290 also includes the second concavity 276 formed thereon. In an embodiment, the second concavity 276 is formed on an opposite side of the sleeve 290 from the well 300.

As alluded to above, the first and second concavities 272, 276 each receive a force applied thereto from the first and second springs 204, 206, respectively. In an embodiment, the first concavity 272 receives force from the first spring 204 via the fitting 268. With reference to FIGS. 2 and 3, the fitting 268 may include a plate 302 that has a first side 304 adapted to contact an end 306 of the first spring 204, and a second side 308 including a projection 310. The plate 302 may be substantially flat and disk-shaped, as shown in cross section in FIGS. 2 and 3, or may have a different shape, such as square, rectangular, or the like. In an embodiment, a ridge 312 may extend axially from the plate 302 for securing the first spring 204 in a desired position. For example, the ridge 312 may be generally circular in shape and may have an outer diameter that is substantially equal to (e.g. ±0.5 mm) an inner diameter of the first spring 204. In another embodiment, a calibration spring 314 may be nested within the first spring 204 to allow the pressure relief valve 200 to be tuned to a threshold force that may be different than that set by the first spring 204. In such case, the ridge 312 may have an inner diameter that is substantially equal to an outer diameter of the calibration spring 314. As shown more clearly in FIG. 3, the projection 310 extends axially from substantially the center of the plate 302 and may have an axial length in a range of between about 0.26 cm to about 0.27 cm. In other embodiments, the axial length may be longer or shorter. In any case, the projection 310 additionally includes a rounded end 316 that is adapted to be disposed in contact with and to rest against the center of the first concavity 272. The second concavity 276 receives force from the second spring 206 via the diaphragm assembly 208. In an embodiment, the rounded first end 242 of the rod 238 may be disposed in contact with and may rest against the center of the second concavity 276.

To increase the useful lives of the fitting 268, the rod 238, and the guide assembly 210 components that include the concavities 272, 276 formed thereon (e.g., the button 278 and the sleeve 290), each may be made of materials that are substantially wear-resistant when exposed to constant contact and pressure exerted thereagainst. Examples of suitable materials include nickel-based superalloys including but not limited to, NiCrAlY, and iron-based superalloys, such as Nitronic 60™ (supplied by G.O. Carlson, Inc. of Thorndale, Pa.), which includes, by weight percent, a maximum of about 0.10 carbon, between about 7.00 and about 9.00 manganese, a maximum of about 0.30 sulfur, a maximum of about 0.060 phosphorus, between about 16.00 to about 18.00 chromium, between about 8.00 and about 9.00 nickel, about 0.08 to about 0.18 nitrogen, between about 3.5 to about 4.5 silicon, and a balance of iron. In an embodiment, both of the components may be made of the same materials. In another embodiment, the components may be made from different materials.

By including the above-described guide assembly 210 and fitting 268 into the pressure relief valve 200, hysteresis may be minimized during operation of the control system. For example, during operation, the first spring 204 may be adapted to supply a first force to the first concavity 272 via the fitting 268. A second force may be supplied to the second concavity 276. In an embodiment, the second spring 206 and a first flow of pressurized air from the torque motor 110 (FIG. 1) through the second line 130 (FIG. 1) may supply a force against the second flexible diaphragm 236, and a second flow of pressurized air from the main duct 102 (FIG. 1) through the third line 134 (FIG. 1) to the diaphragm assembly 208 may supply a force against the first flexible diaphragm 234. The sum of the forces from the second spring 206 and the first and second flows of pressurized air may make up the second force.

When the first force and the second force are substantially equal to each other, the lever plate 202 is maintained in a closed position so that air flow through the pressure relief outlet 220 is prevented. Additionally, the springs 204, 206, concavities 272, 276, rod 238, and guide assembly 210 are positioned along a common axis 232, in an embodiment, which is substantially perpendicular to the lever plate 202. When the first force is less than the second force, the lever plate 202 transitions to an open position so that air may flow through the flow passage inlet 288. In such case, the lever plate 202 may be no longer perpendicular to the axis 232, while the first spring 204 and the second spring 206 may remain aligned along the axis 232. Despite the misalignment, the forces exerted by the springs 204, 206 against the lever plate 202 are applied to the same area of the lever plate 202 as when the lever plate 202 is perpendicular to the axis 232, because the concavities 272, 276 act as pivot points for the rounded ends of the fitting 268 (in contact with the first spring 204) and the diaphragm assembly rod 238 (in contact with the second spring 206).

Thus, an improved pressure relief valve has now been provided that may minimize hysteresis during operation, as compared to conventional pressure relief valves. Additionally, the improved pressure relief valve may be retrofitted into currently existing engines or aircraft and may be relatively simple and inexpensive to implement. Moreover, the improved pressure relief valve may be implemented without the use of additional adhesives or brazing. As a result, sensitivity of the lever plate 202 to force differentials between the first and the second forces may be improved over conventional pressure relief valves.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A pressure relief valve comprising:
   a lever plate having a first side, a second side, and an opening extending therebetween;
   a first spring positioned on the first side of the lever plate and having a first end, the first spring adapted to supply a first force against the lever plate in a first direction;
   a fitting having a first side, a second side, and a flange extending from the second side of the fitting, the fitting including a surface with which the first end of the first spring contacts, and the flange including a rounded end;
   a guide assembly having a first side, a second side, a first concavity, and a second concavity, at least a portion of the guide assembly extending through the opening of the lever plate, the first concavity formed on the first side of the guide assembly and contacting the rounded end of the flange of the fitting, and the second concavity aligned coaxially with the first concavity;
   a diaphragm assembly including a rod having a rounded end, the rounded end of the rod disposed in contact with the second concavity of the guide assembly; and
   a second spring adapted to supply a second force against the diaphragm assembly to move the lever plate in a second direction that is substantially opposite the first direction.

2. The pressure relief valve of claim 1, wherein the guide assembly comprises:
   a button having a first side, a second side, the first concavity, and a stem, the stem extending from the second side of the button and through the opening of the lever plate and including an end; and
   a sleeve including a well and the second concavity, the well including the end of the stem disposed therein, and the second concavity formed on an opposite side of the sleeve from the well.

3. The pressure relief valve of claim 1, further comprising:
   a mount plate including a flow passage formed therethrough, the flow passage having an inlet over which a portion of the lever plate is disposed.

4. The pressure relief valve of claim 3, further comprising an outer housing having an inner surface defining a cavity within which the first spring and the fitting are disposed, wherein the mount plate has a surface that is spaced apart from the inner surface of the outer housing to define a chamber therebetween, and the lever plate is coupled to the mount plate and extends over at least a portion of the surface of the mount plate.

5. The pressure relief valve of claim 1, wherein:
   the rod of the diaphragm assembly includes a radial flange, and
   the diaphragm assembly further comprises a first flexible diaphragm, a second flexible diaphragm, and a spacer, the spacer disposed between the first flexible diaphragm and the second flexible diaphragm and including a first end, a second end, and a passage formed therebetween through which a portion of the rod extends, the first flexible diaphragm including a portion disposed between the radial flange of the rod and the first end of the spacer, and the second flexible diaphragm disposed between the second end of the spacer and the second spring.

6. The pressure relief valve of claim 5, further comprising:
   a second air flow source passage adapted to supply air at a second pressure to the second flexible diaphragm,
   wherein when a sum of the air supplied at the first pressure and the air supplied at the second pressure exert a fourth force against the lever plate that is greater than the first force, the lever plate moves toward the first spring.

7. The pressure relief valve of claim 1, wherein the lever plate comprises 17-7 stainless steel.

8. The pressure relief valve of claim 1, wherein the lever plate comprises a nickel-based superalloy.

9. The pressure relief valve of claim 1, wherein at least a portion of the guide assembly comprises NiCrAlY.

10. The pressure relief valve of claim 1, wherein at least a portion of the guide assembly comprises an iron-based superalloy having a composition including, in weight percent, up to about 0.10 carbon, between about 7.00 and about 9.00 manganese, up to about 0.30 sulfur, up to about 0.060 phosphorus, between about 16.00 to about 18.00 chromium, between about 8.00 and about 9.00 nickel, about 0.08 to about 0.18 nitrogen, between about 3.5 to about 4.5 silicon, and a balance of iron.

11. The pressure relief valve of claim 1, further comprising a calibration spring disposed coaxially with the first spring and having an end in contact with the lever plate.

12. The pressure relief valve of claim 1, wherein the first force of the first spring and the second force of the second spring are substantially equal to each other when the pressure relief valve is in a steady state.

13. A pneumatic control valve system comprising:
   a main duct;
   a torque motor in flow communication with the main duct;
   a pressure relief valve in flow communication with and disposed between the torque motor and the main duct, the pressure relief valve including:
      a lever plate having a first side, a second side, and an opening extending therebetween,
      a first spring positioned on the first side of the lever plate and having a first end, the first spring adapted to supply a first force against the lever plate in a first direction,
      a fitting having a first side, a second side, and a flange extending from the second side of the fitting, the fitting including a surface with which the first end of the first spring contacts, and the flange including a rounded end,
      a guide assembly having a first side, a second side, a first concavity, and a second concavity, at least a portion of the guide assembly extending through the opening of the lever plate, the first concavity formed on the first side of the guide assembly and contacting the rounded end of the fitting flange, and the second concavity aligned coaxially with the first concavity,
      a diaphragm assembly including a first flexible diaphragm, a second flexible diaphragm, and a rod extending therebetween, the rod having a rounded end disposed in contact with the second concavity of the guide assembly, and
      a second spring adapted to supply a second force against the diaphragm assembly to move the lever plate in a second direction that is substantially opposite the first direction;

a first air supply passage adapted to supply air at a first pressure to a space between the first flexible diaphragm and the second flexible diaphragm; and a second air supply passage adapted to supply air at a second pressure to the second flexible diaphragm.

14. The system of claim 13, wherein the guide assembly comprises:
   a button having a first side, a second side, the first concavity, and a stem, the stem extending from the second side of the button and through the opening of the lever plate and including an end; and
   a sleeve including a well and the second concavity, the well including the end of the stem disposed therein, and the second concavity formed on an opposite side of the sleeve from the well.

15. The system of claim 13, further comprising:
   a mount plate including a flow passage formed therethrough, the flow passage having an inlet over which a portion of the lever plate is disposed.

16. The system of claim 15, further comprising an actuator in flow communication with the flow passage of the mount plate.

17. The system of claim 16, further comprising a valve disposed in the main duct, the valve coupled to the actuator.

18. The system of claim 13, further comprising a reference regulator in flow communication with and disposed between the torque motor and the main duct.

19. The system of claim 13, further comprising a calibration spring disposed coaxially with the first spring and having an end in contact with the lever plate.

20. The system of claim 13, wherein the first force of the first spring and the second force of the second spring are substantially equal to each other when the pressure relief valve is in a steady state.

* * * * *